United States Patent [19]
Katayama et al.

[11] Patent Number: 4,467,665
[45] Date of Patent: Aug. 28, 1984

[54] SYNCHRONIZING DEVICE FOR TRANSMISSION

[75] Inventors: Nobuaki Katayama; Yukio Terakura; Kazuhito Ikemoto, all of Toyota; Kan Sasaki, Aichi, all of Japan

[73] Assignee: Toyota Jidosha Kogyo Kabushiki Kaisha, Toyota, Japan

[21] Appl. No.: 257,138

[22] Filed: Apr. 24, 1981

[30] Foreign Application Priority Data

Feb. 17, 1981 [JP] Japan .................................. 56-21951

[51] Int. Cl.³ .......................... F16H 3/38; B60K 41/26
[52] U.S. Cl. .................................... 74/339; 74/411.5; 74/475; 74/477; 192/4 C
[58] Field of Search .............. 74/339, 475, 477, 411.5; 192/4 C

[56] References Cited

U.S. PATENT DOCUMENTS

| | | | |
|---|---|---|---|
| 2,847,871 | 8/1958 | Schick | 74/477 |
| 3,545,295 | 12/1970 | Ravello | 74/339 |
| 4,016,773 | 4/1977 | Galas et al. | 74/339 |
| 4,192,410 | 3/1980 | Poirer | 74/339 |
| 4,237,745 | 12/1980 | Katayama et al. | 74/339 |
| 4,330,053 | 5/1982 | Gesenhaus | 74/411.5 |
| 4,332,312 | 6/1982 | Sabel et al. | 74/411.5 |

FOREIGN PATENT DOCUMENTS 0022411  1/1981  European Pat. Off. ........... 74/411.5

Primary Examiner—Allan D. Herrmann
Assistant Examiner—Joseph M. Rolnicki
Attorney, Agent, or Firm—Cushman, Darby & Cushman

[57] ABSTRACT

A synchronizing device for a transmission including a shift interlocking mechanism having play of a predetermined distance wherein adjacent fork shafts are simultaneously actuated when reverse shift is effected, so that synchronization with the rotation of an output shaft can be obtained by using a synchronizing device of the forward stage. Synchronization can be achieved readily when reverse shift is effected and shifting can be done smoothly without producing noise.

9 Claims, 13 Drawing Figures

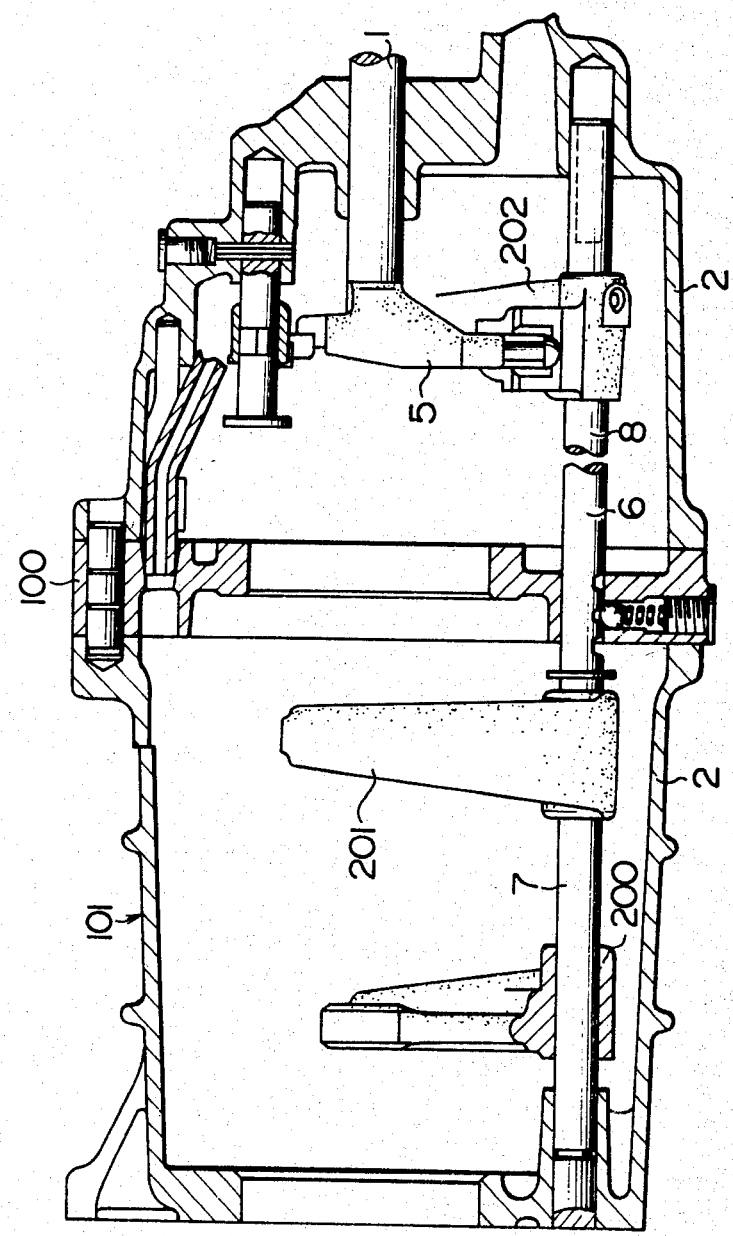

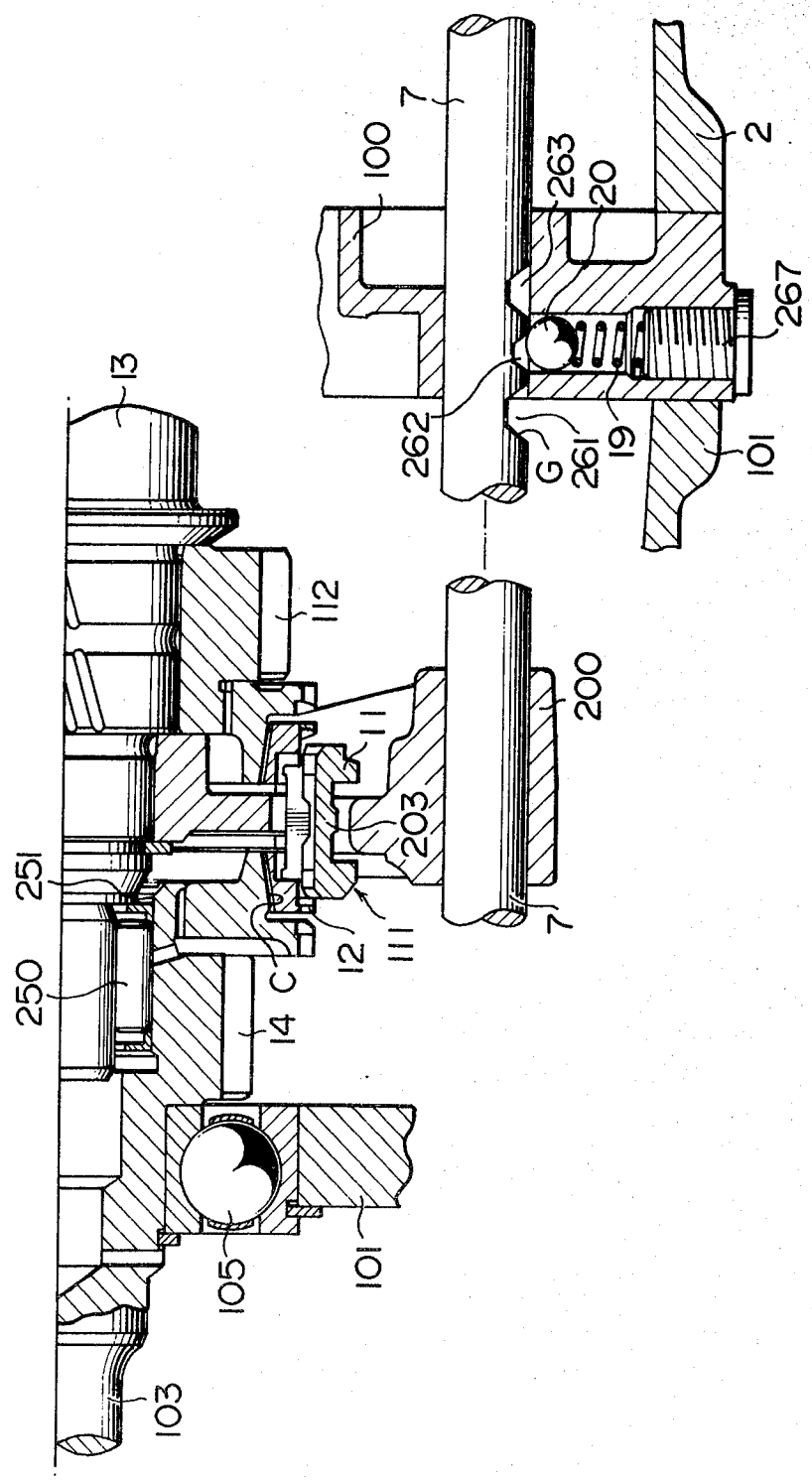

SYNCHRONIZING DEVICE FOR TRANSMISSION

BACKGROUND OF THE INVENTION

This invention relates to synchronizing devices for transmissions for automotive vehicles, and more particularly it is concerned with a simple synchronizing device for a manually operated transmission for reversing movement.

Heretofore, no synchronizing device has ever been provided for effecting reversing movement by a transmission used with an automotive vehicle, for example, and when gear shift is swiftly carried out or when gear shift for reversing movement is carried out during low speed forward movement, difficulties have been experienced in smoothly effecting gear shift without producing noise. Nowadays oil of low viscosity is favored and dragging torque has shown a reduction (due to the adoption of roller bearings), so that counter gears or other parts that are normally meshing and rotating at all times do not instantly show a reduction in rotation when the clutch is disengaged while the vehicle remains stationary at neutral shift position. This results in the production of noise during gear shift. Thus the need to provide improvements to the transmission to enable gear shift to be readily and smoothly effected for reversing movement without producing noise has been keenly felt.

In the case of a transmission with a reverse gear train of the normally meshing type, it is possible to readily provide a synchronizing device of the same construction as that for the forward movement. However, such synchronizing device suffers the following two disadvantages.

Firstly, with the reverse gear being in reverse position, a sliding movement of high sliding speed occurs between the reverse gear and the output shaft at the time of forward movement. This makes it necessary to provide means for preventing seizure, thereby increasing cost. Secondly, since the reverse idler gear and the reverse gear are in meshing engagement with each other at all times, noise is produced at neutral position and efficiency is lowered. Moreover, equivalent inertia moment increases when speed change is effected in forward movement, thereby giving an unpleasant feel to the driver in gear shift.

In view of these problems, it is desirable, generally speaking, to adopt a reverse gear train of the selective sliding type in which the reverse idler gear or the reverse gear is selectively moved in sliding movement. However, in view of the construction of this type of reverse gear train, difficulties are encountered in additionally mounting constituent elements of a synchronizing device, such as a synchronizer ring, a shifting key, etc.

SUMMARY OF THE INVENTION

The present invention has been developed for the purpose of obviating the aforesaid problems of the prior art by utilizing the synchronizing mechanism of the forward movement. The invention has as its object the provision of a synchronizing device for a transmission which effects synshronization by pushing the fork shafts of the forward stages in effecting gear shift for reverse movement, to thereby reduce noise production at gear shift for reverse movement and increase the ease and smoothness with which reverse movement can be obtained.

The features of the invention include a shaft interlocking mechanism provided with play of a predetermined distance, so that adjacent fork shafts of the forward movement can be simultaneously actuated when gear shift for reverse movement is effected, so that synchronization with the rotation of an output shaft can be obtained. Thus synchronization can be readily achieved for reverse movement without producing noise by smooth and swift gear shift. Feel of the driver at gear shift for reverse movement shows no change even if there is a reduction in dragging torque and oil of low viscosity is used.

BRIEF DESCRIPTION OF THE DRAWINGS

The drawings illustrate preferred embodiments of the invention.

FIG. 4 is a transverse sectional view showing the relative positions of the shift and select lever, fork shafts, etc.;

FIGS. 7 and 8 are vertical sectional views showing the essential portions of the lock ball mechanism before actuation and after actuation respectively;

DESCRIPTION OF THE PREFERRED EMBODIMENTS

Figure 1:
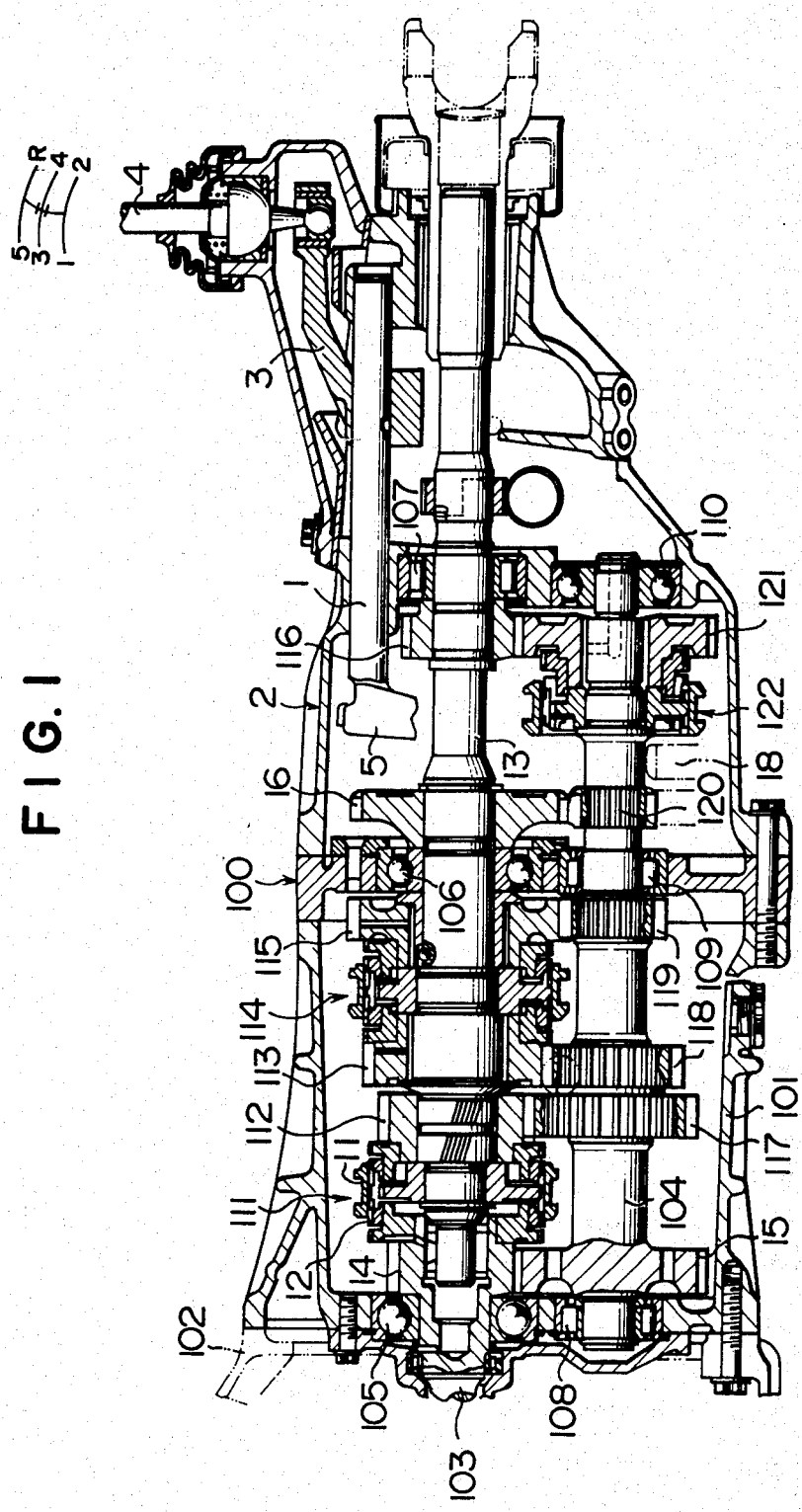
FIG. 1 is a vertical sectional view of a transmission of the selective sliding reverse type.

Embodiments of the invention will now be described by referring to the accompanying drawings. FIGS. 1-10 show an embodiment which is incorporated in a manually operated transmission of what is generally referred to as a selective sliding reverse type in which the reverse idler gear is moved in sliding movement to provide a reverse gear train. FIG. 1 shows the essential portions of this type of transmission which includes a known gear train of five forward movement stages and one reverse movement stage. As shown, an extension housing 2, an intermediate plate 100, a transmission case 101 and a clutch housing 102 are disposed in end-to-end relation for supporting therein an input shaft 103, an output shaft 13 and a counter shaft 104 that constitute the aforesaid gear train. The input shaft 103 and the output shaft 13 are located coaxially and journaled by bearings 105-107, and the counter shaft 104 is located parallel to the input and output shafts 103 and 13 and journaled by bearings 108-110. The input shaft 103 is formed at one end thereof with a fourth-stage gear 14 and has, in its center axis portion, an opening 251 (see FIG. 7) cooperating with one end of the output shaft 13 and a cylindrical roller 250 to constitute a bearing section. Disposed on the output shaft 13 opposite the fourth-stage gear 14 with respect to a synchronizing device 111 is a third-stage gear 112 disposed adjacent a second-stage gear 113. A first-stage gear 115 is disposed opposite the second-stage gear 113 with respect to another synchronizing device 114. A reverse gear 16 is disposed adjacent the first-stage gear 115, and a fifth-stage gear 116 is disposed adjacent the reverse gear 16.

The counter shaft 104 has mounted thereon counter gears 15 and 117–119 adapted to mesh with the fourth-stage gear 14, third-stage gear 112, second-stage gear 113 and first-stage gear 115 respectively. The counter shaft 104 also mounts thereon a counter reverse gear 120 meshing with the reverse gear 16, and a fifth-stage counter gear 121 meshing with the fifth-stage gear 116 and disposed in end-to-end relation to a synchronizing device 122.

Figure 2A:
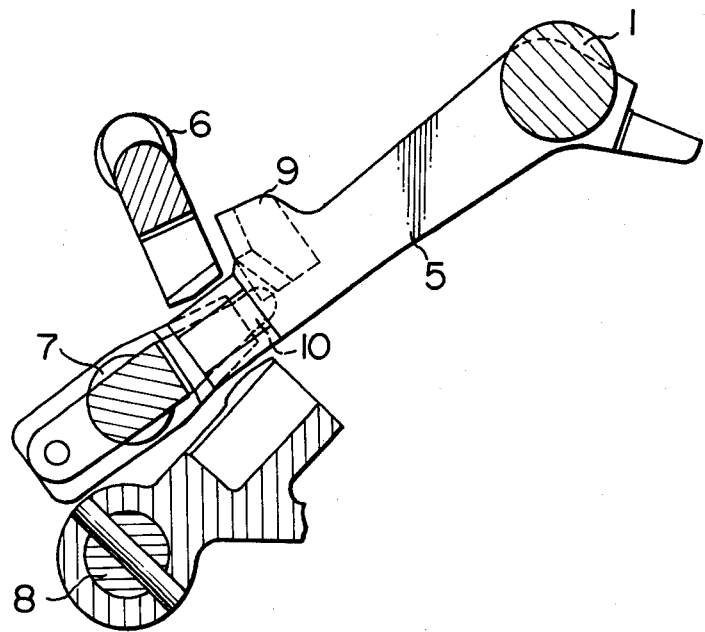
FIGS. 2a and 2b are vertical sectional views showing the essential portions of the shift and select lever and the fork shaft head.

Extending longitudinally through the extension housing 2 is a shift and select lever 1 which is connected to a shift lever housing 3 and a shift lever 4. The shift and select lever 1 moves back and forth as the shift lever 4 is actuated in shifting direction and moves in pivotal movement as the shift lever 4 is actuated in selecting direction, so that a head 5 at the forward end of the shift and select lever 1 is introduced into one of grooves formed in first, second and third fork shafts 6, 7 and 8 respectively and moves the respective fork shaft axially thereof (see FIGS. 2a and 2b), thereby completing selecting and shifting. The fork shafts 6, 7 and 8 have a shift fork 201 for forward first and second stages, a shift fork 200 for third and fourth stages and a shift fork 202 for fifth stage respectively (see FIGS. 4 and 7). The head 5 of the shift and select lever 1 has a projection 9 formed with an inclined surface S which does not come into contact, as shown in FIG. 2a, with parts at all when forward first and second stages and forward third and fourth stages are selected.

Figure 2B:
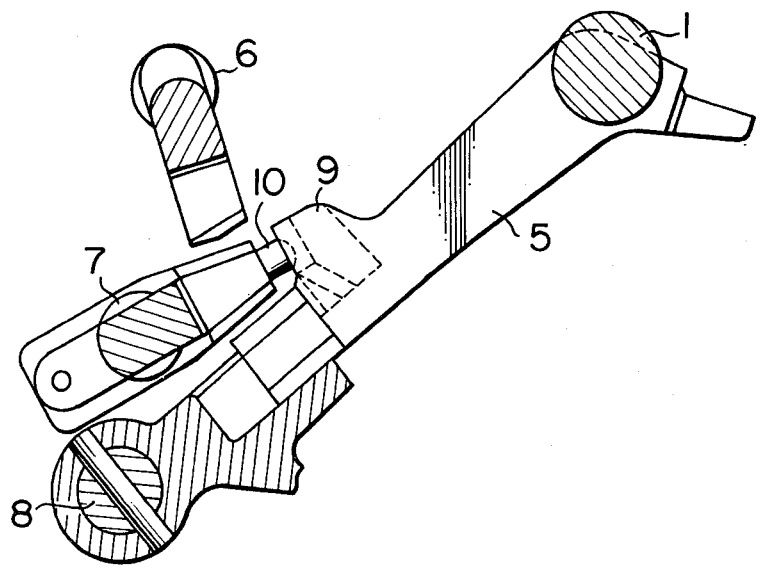

When forward fifth stage and reverse is selected, the projection 9 of the head 5 is brought into contact at the inclined surface S with a pin 10 of the second fork shaft 7 disposed adjacent thereto, as shown in FIG. 2b. The pin 10 is fitted in a stepped bore 50 formed in the second fork shaft 7 (see FIG. 3) and pressed by a spring 17 mounted between the pin 10 and another pin 51 preventing the pin 10 from being dislodged. By this arrangement, when reverse shift is effected, the head 5 actuates the second fork shaft 7 axially simultaneously as it actuates the third fork shaft 8.

As shown in FIG. 7, the second fork shaft 7 is connected to a sleeve 11 of the forward stage through the fourth stage shift fork 200, so that actuation of the shift and select lever 1 axially moves the sleeve 11 and pushes a key 203, to thereby press a synchronizer ring 12. Since the sleeve 11 is directly connected to the output shaft 13, synchronizing of the input gear 14 and counter gear 15 is effected each time the synchronizer ring 12 is pressed against a synchronizing surface C of the input gear 14. Since the reverse gear 16 is generally actuated after the vehicle has become stationary, rotation of the input gear 14 and counter gear 15 slows down and the relative difference in rotation between the input and counter gears 14 and 15 and the reverse gear 16 secured to the output shaft 13 becomes very small.

Figure 5:
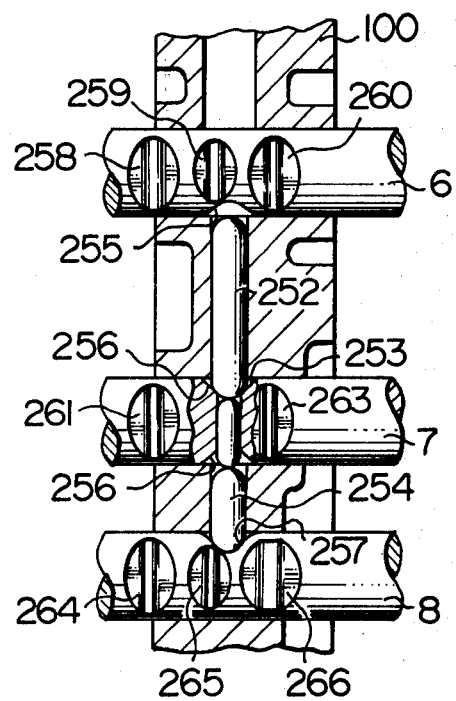
FIGS. 5 and 6 are plan views showing the essential portions of the interlocking mechanism before actuation and after actuation respectively.

An interlocking mechanism including slide pins 252, 253 and 254 and locking grooves 255, 256 and 257 is mounted between the first fork shaft 6, second fork shaft 7 and third fork shaft 8 as shown in FIG. 5. Further operation of reverse shift brings the second and third fork shafts 7 and 8 to the positions shown in FIG. 6 after their synchronous movements, where they are interlocked and prevented from further movement. However, a further increase in shift load moves the pin 10 in the second fork shaft 7 downwardly against the biasing force of the spring 17 shown in FIG. 3. Thus the second fork shaft 7 is prevented from moving further axially and the third fork shaft 8 alone moves to actuate a reverse idler gear 18 axially into meshing engagement with the reverse gear 16 and reverse counter gear 120, thereby completing reverse shift.

Figure 6:
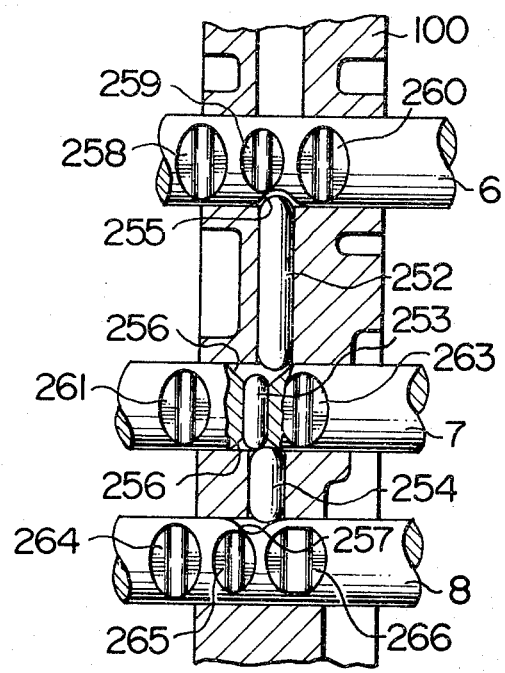
Figure 8:
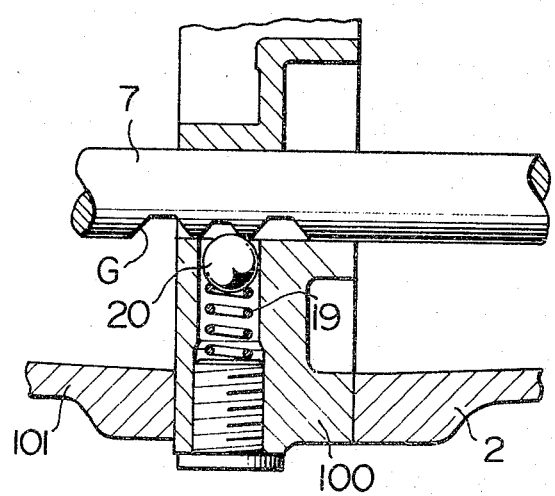

Meanwhile, as shown in FIG. 7, the second fork shaft 7 is provided with a lock ball mechanism including a lock ball 20 and lock grooves 261–263 for preventing dislodging of the gear and for giving the feel of impact to the driver. As shown in FIGS. 5 and 6, the first and third fork shafts 6 and 8 are also formed with lock grooves 258–260 and 264–266 respectively, and the lock ball 20 is pressed by a spring 19 force fitted in a plug hole 267 as shown in FIG. 7. When the fork shafts are disposed in positions shown in FIG. 6, the lock ball and its associated parts are as shown in FIG. 8, so that the ball 20 is disposed on an inclined surface of lock ball grooves G. However when reverse shift has completed, the shift and select lever 1 has further been actuated, so that the pin 10 is brought out of contact with the inclined surface S of the projection 9 on the head 5 of the lever 1 and into contact with a planar surface. Thus the ball 20 shown in FIG. 8 is pressed by the biasing force of the spring 19 and restores the second fork shaft 7 to the position shown in FIG. 7 by the action of the inclined surface. Thus synchronization is released and no simultaneous meshing with forward stage gears occurs. The use of the synchronizing devices of fourth stages is most advantageous for prolonging the service life thereof and in view of other factors.

Figure 3:
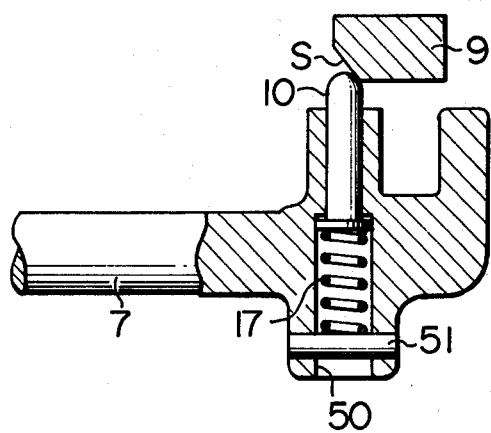
FIG. 3 is a vertical sectional view showing the essential portions of the second fork shaft.

When the lever 1 is in a position for selecting forward fifth stage or reverse, it is essential that there be no play in shifting direction between the pin 10 and projection 9 in FIG. 3. To this end, play is prevented from occurring in this embodiment by causing the inclined surface S of the projection 9 to slightly press the pin 10 against the biasing force of the spring 17 when the lever 1 is in the position for selecting forward fifth stage or reverse. The inclined surface S of the projection 9 is shaped such that movement of the fork shaft 7 in shifting direction is avoided as much as possible when selection is carried out.

Figure 9:
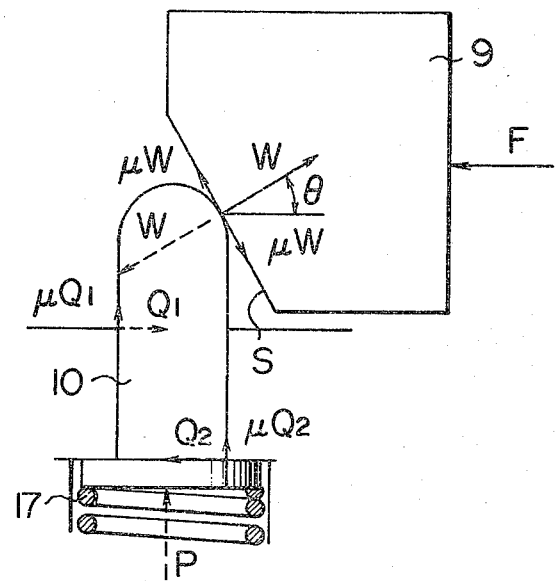
FIGS. 9 and 10 are views showing the relative forces exerted on the projection of the head and the pin.

Assume that a force F is exerted on the shift and select lever 1. FIG. 9 diagrammatically shows the relation between forces, wherein F, W, $Q_1$ and $Q_2$, P and $\mu$ denote a force exerted on the shift and select lever 1, a force tending to act perpendicularly on the point of contact between the shift and select lever 1 and pin 10, forces acting perpendicularly on the wall of the pin 10, the biasing force of the spring 17 and the coefficient of friction, respectively. The forces acting on the shift and select lever 1 and the pin 10 are indicated by → and ⇢ respectively.

The relation between the forces F and W can be expressed by the following equation in view of balancing of the forces:

$$F = W \cos \theta + \mu W \sin \theta \qquad (1)$$
$$= W(\cos \theta + \mu \sin \theta)$$

The relations between the forces P and W and between $Q_1$, $Q_2$ and W can be expressed by the following equations in view of balancing of the forces:

$$P = W\sin\theta - \mu W\cos\theta - \mu(Q_1 + Q_2) \quad (2)$$
$$= W(\sin\theta - \mu\cos\theta) - \mu(Q_1 + Q_2)$$
$$Q_1 - Q_2 = W\cos\theta + \mu W\sin\theta \quad (3)$$
$$= W(\cos\theta + \mu\sin\theta) = F$$

From equation (1):

$$W = \frac{F}{\cos\theta + \mu\sin\theta} \quad (4)$$

By substituting equation (4) for W in equation (2):

$$P = \frac{\sin\theta - \mu\cos\theta}{\cos\theta + \mu\sin\theta} F - \mu(Q_1 + Q_2) \quad (5)$$

Thus the following condition must be satisfied for moving the fork shaft:

$$P > \frac{\sin\theta - \mu\cos\theta}{\cos\theta + \mu\sin\theta} F - \mu(Q_1 + Q_2).$$

Figure 10:
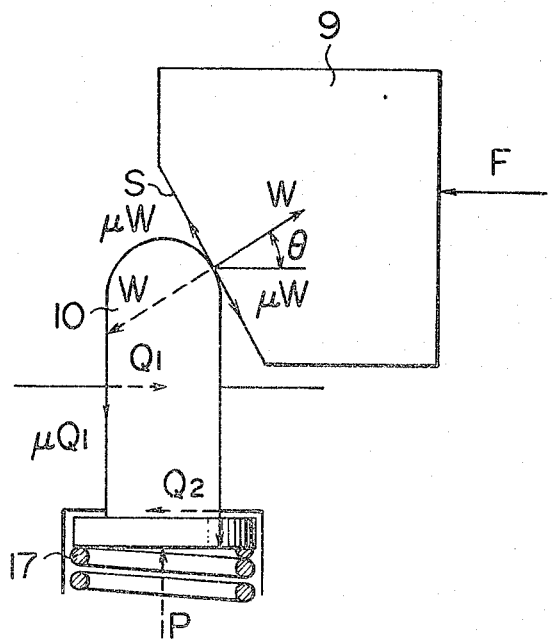

Assume that the biasing force P of the spring 17 acts on the pin 10. The relations of powers are shown in FIG. 10. In view of balancing of the forces acting on the shift and select lever 1, the following relation is established:

$$F = W\cos\theta - \mu W\sin\theta \quad (6)$$
$$= W(\cos\theta - \mu\sin\theta)$$

In view of balancing of the forces acting on the pin 10, the following relation is established:

$$P = W\sin\theta + \mu W\cos\theta + \mu(Q_1 + Q_2) \quad (7)$$
$$= W(\sin\theta + \mu\cos\theta) + \mu(Q_1 + Q_2)$$
$$Q_1 - Q_2 = W\cos\theta - \mu\sin\theta \quad (8)$$
$$= W(\cos\theta - \mu\sin\theta) = F$$

From equation (6):

$$W = \frac{F}{\cos\theta - \mu\sin\theta} \quad (9)$$

By substituting equation (9) into equation (7):

$$P = \frac{\sin\theta + \mu\cos\theta}{\cos\theta - \mu\sin\theta} F + \mu(Q_1 + Q_2) \quad (10)$$

Thus, the following condition must be satisfied to move the fork shaft:

$$P < \frac{\sin\theta + \mu\cos\theta}{\cos\theta - \mu\sin\theta} F + \mu(Q_1 + Q_2).$$

By taking the aforesaid two conditions into consideration, the spring load P may be designed to be in the following range:

$$\frac{\sin\theta - \mu\cos\theta}{\cos\theta + \mu\sin\theta} F - (Q_1 + Q_2) < P < \frac{\sin\theta + \mu\cos\theta}{\cos\theta - \mu\sin\theta} F + \mu(Q_1 + Q_2) \quad (11)$$

Here, $\mu(Q_1+Q_2)$ is considered to be the sliding resistance offered to the pin 10. The greater the value of $\mu(Q_1+Q_2)$, the wider becomes the range of the value of P, thereby making designing easier. However, if one considers there is no resistance or $\mu(Q_1+Q_2)=0$ and designing is less easy, then equation (11) can be rewritten as follows:

$$\frac{\sin\theta + \mu\cos\theta}{\cos\theta + \mu\sin\theta} F < P < \frac{\sin\theta + \mu\cos\theta}{\cos\theta - \mu\sin\theta} F$$

Therefore;

$$\frac{\tan\theta - \mu}{1 + \mu\tan\theta} F < P < \frac{\tan\theta + \mu}{1 - \mu\tan\theta} F.$$

Figure 11:
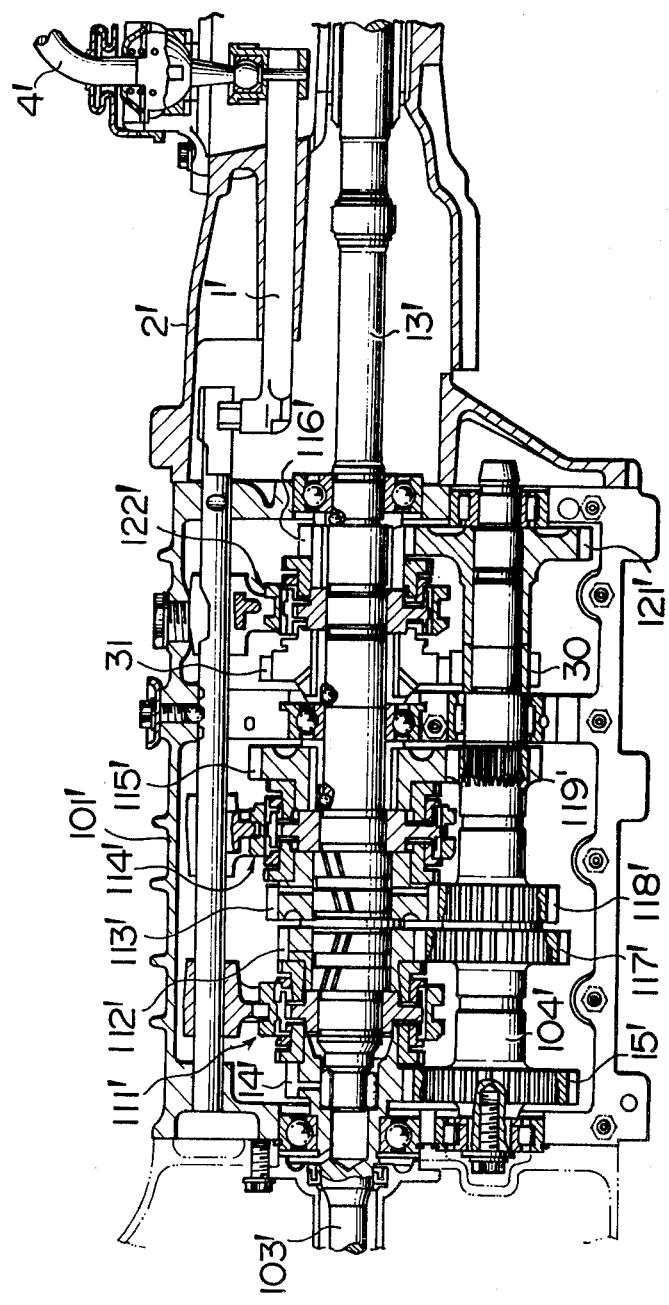
FIG. 11 is a vertical sectional view of the essential portions of a transmission of the normally meshing type.
Figure 12:
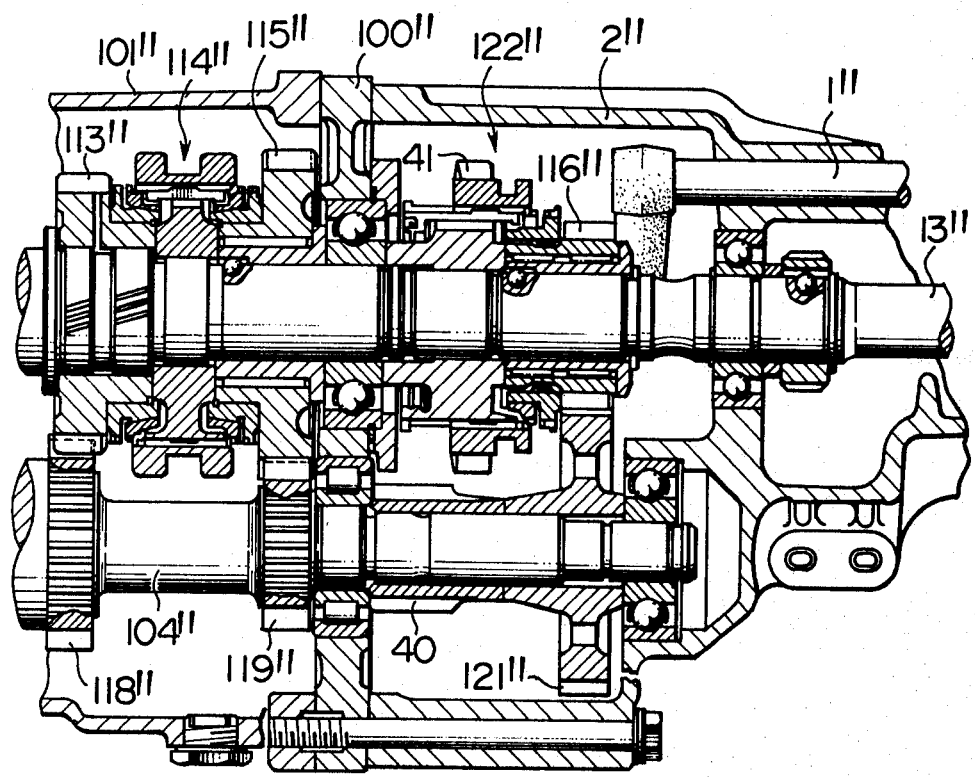
FIG. 12 is a vertical sectional view of the essential portions of a transmission of the selective sliding reverse gear type.

In the embodiment shown and described hereinabove, the invention has been incorporated in a transmission of the selective sliding reverse type in which the reverse idler gear is selectively moved in sliding movement. However, the invention can have application in a transmission of what is generally referred to as normally meshing reverse type in which, as shown in FIG. 11, a reverse counter gear 30, reverse idler gear and reverse gear 31 are normally in meshing engagement with one another at all times and reverse is accomplished by means of a change-over device without being provided with a synchronizing device. The invention also can have application in a transmission of the selective sliding reverse gear type shown in FIG. 12 in which a reverse gear 41 is selectively moved in sliding movement into meshing engagement with a reverse counter gear 40 at all times, and a transmission of the type in which the shift fork shafts are directly operated by a shift lever in place of through the intermediately of a shift and select lever (unitary with the intermediate rod). Parts in FIGS. 11 and 12 with the mark (') correspond to the parts in FIGS. 1-9 without the mark.

What is claimed is:

1. A synchronizing device for a transmission which is operative to effect reverse shift by actuating fork shafts of the transmission forward stages and obtain synchronizing of a counter gear with an output shaft in rotation by means of a synchronating device of the forward stage, characterized in that a shift and select lever has a projection formed with an inclined surface which comes into contact with a spring-loaded pin provided on one of said fork shafts of the forward stages to actuate said fork shaft of the forward stage for synchronizing only when the reverse stage is selected and only until a compressive force between said spring-loaded pin and said inclined surface reaches a predetermined value.

2. A synchronizing device as claimed in claim 1, wherein said fork shafts are provided with an interlocking mechanism having play of a predetermined distance.

3. A synchronizing device as claimed in claim 1, wherein said fork shafts comprise a first fork shaft, a second fork shaft and a third fork shaft, one of said fork shafts being connected to a sleeve of the forward stage through a fork, whereby synchronizing of the counter gear with an input gear can be obtained.

4. A synchronizing device as claimed in claim 2, wherein said spring-loaded pin is adapted to be pressed by said inclined surface to slightly move said fork shaft against the biasing force of the spring when reverse shift is effected, and said fork shaft is pressed by said interlocking mechanism to be restored to the original position when reverse shift is completed.

5. A synchronizing device as claimed in claim 4, wherein said interlocking mechanism includes a lock ball mechanism for restoring the fork shaft to its original position.

6. A synchronizing device as claimed in any one of claims 1-5, wherein the synchronizing device is incorporated in a transmission of the selective sliding reverse type wherein a reverse idler gear and a reverse gear are moved in sliding movement to accomplish a reverse gear train.

7. A synchronizing device as claimed in any one of claims 1-5, wherein the synchronizing device is incorporated in a transmission of the normally meshing reverse type in which a reverse counter gear, a reverse idler gear and a reverse gear are normally meshing with one another at all times for effecting reverse by means of a changeover device without having a synchronizing device.

8. A synchronizing device as claimed in any one of claims 1-5, wherein the synchronizing device is incorporated in a transmission of the selectively sliding reverse gear type in which a shift fork shaft is directly operated by a shift lever.

9. A synchronizing device as claimed in any one of claims 1-5, wherein $$\frac{\tan \theta - \mu}{1 + \mu \tan \theta} F < P < \frac{\tan \theta + \mu}{1 - \mu \tan \theta}$$

F is effected, wherein F denotes a force exerted on said shift and select lever, P a biasing force of said spring-loaded pin, $\mu$ a coefficient of friction between said spring-loaded pin and said inclined surface and $\theta$ an angle between the direction of said force exerted on said shift and select lever and the perpendicular line of said inclined surface.

* * * * *